United States Patent
Plioska et al.

(10) Patent No.: US 11,333,199 B2
(45) Date of Patent: May 17, 2022

(54) ASSEMBLY FOR A BEARING AND METHODS OF MAKING AND USING THE SAME

(71) Applicant: SAINT-GOBAIN PERFORMANCE PLASTICS CORPORATION, Solon, OH (US)

(72) Inventors: Lukas Plioska, Nettetal (DE); Brandon S. Murphy, West Milford, NJ (US); Kristen A. Michaelson, Morristown, NJ (US); Abe Sanchez, Dover, NJ (US); Man Fung Chow, Staten Island, NY (US); Grzegorz Kraszewski, Glenwood, NJ (US); Baltasar R. Garcia, Hawthorne, NJ (US)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 0 days.

(21) Appl. No.: 16/651,730

(22) PCT Filed: Sep. 28, 2018

(86) PCT No.: PCT/US2018/053292
§ 371 (c)(1),
(2) Date: Mar. 27, 2020

(87) PCT Pub. No.: WO2019/067830
PCT Pub. Date: Apr. 4, 2019

(65) Prior Publication Data
US 2020/0232508 A1 Jul. 23, 2020

Related U.S. Application Data

(60) Provisional application No. 62/564,856, filed on Sep. 28, 2017, provisional application No. 62/581,122, filed on Nov. 3, 2017.

(51) Int. Cl.
*F16C 33/20* (2006.01)
*F16C 23/04* (2006.01)
*F16C 17/04* (2006.01)

(52) U.S. Cl.
CPC .............. *F16C 33/20* (2013.01); *F16C 17/04* (2013.01); *F16C 23/04* (2013.01); *F16C 33/203* (2013.01)

(58) Field of Classification Search
CPC ........ F16C 17/04; F16C 17/10; F16C 17/105; F16C 17/18; F16C 17/26; F16C 23/02;
(Continued)

(56) References Cited

U.S. PATENT DOCUMENTS 361,233 A * 4/1887 Parker .................... B62K 21/06
280/279
433,760 A * 8/1890 Barr ....................... B62K 21/06
280/279
(Continued)

FOREIGN PATENT DOCUMENTS

CN 2602210 Y 2/2004
CN 2602211 Y 2/2004
(Continued)

OTHER PUBLICATIONS

Machine Translation of JP-10122233-A (Year: 1998).*

*Primary Examiner* — Alan B Waits
(74) *Attorney, Agent, or Firm* — Abel Schillinger, LLP; David G Miranda

(57) ABSTRACT

An assembly comprising: a core in the form of a toroid; and at least one washer overlying the core, the washer comprising a polymer, wherein the washer has an arcuate cross-section so as to have a shape complementary to the core.

16 Claims, 5 Drawing Sheets

(58) Field of Classification Search
CPC ...... F16C 23/04; F16C 23/043; F16C 23/048; F16C 25/02; F16C 25/04; F16C 33/20; F16C 33/203; F16C 33/205; F16C 33/206; F16C 2326/05; F16C 2326/26; B62K 21/06

See application file for complete search history.

(56) References Cited

U.S. PATENT DOCUMENTS

| | | | |
|---|---|---|---|
| 3,476,009 | A | 11/1969 | Markey |
| 3,549,214 | A | 12/1970 | Neilson |
| 3,726,576 | A | 4/1973 | Barnbrook et al. |
| 4,269,460 | A | 5/1981 | Orain |
| 4,561,669 | A | 12/1985 | Simons |
| 5,380,100 | A | 1/1995 | Yu |
| 6,125,541 | A | 10/2000 | Parker |
| 6,244,609 | B1 | 6/2001 | Wilson |
| 7,000,909 | B2* | 2/2006 | Kellam ............... B60G 15/063 267/221 |
| 7,407,329 | B2 | 8/2008 | Watai et al. |
| 7,731,445 | B2* | 6/2010 | Coaplen ............... B62K 21/06 403/367 |
| 8,262,292 | B2* | 9/2012 | Hsieh ................. B62K 21/06 384/545 |
| 8,328,427 | B2* | 12/2012 | Kellam ............... B60G 15/068 384/420 |
| 8,905,409 | B2 | 12/2014 | Murakami |
| 2004/0047527 | A1* | 3/2004 | Jiang ................. B62K 21/06 384/545 |
| 2004/0130115 | A1* | 7/2004 | Kellam ............... F16C 33/74 280/124.147 |
| 2006/0037799 | A1 | 2/2006 | Matron |
| 2006/0140523 | A1 | 6/2006 | Miyata et al. |
| 2006/0220291 | A1 | 10/2006 | Vincenzo |
| 2007/0045982 | A1 | 3/2007 | Tomonaga |
| 2007/0160314 | A1 | 7/2007 | Richie et al. |
| 2008/0035246 | A1 | 2/2008 | Kawamura et al. |
| 2008/0100026 | A1* | 5/2008 | Bouchez ............... B62K 19/32 280/279 |
| 2008/0310780 | A1* | 12/2008 | Watai .................. F16C 17/18 384/420 |
| 2010/0003096 | A1 | 1/2010 | Peigne |
| 2010/0040317 | A1* | 2/2010 | Kellam ............... F16C 33/20 384/482 |
| 2011/0049834 | A1 | 3/2011 | Natu |
| 2019/0092417 | A1* | 3/2019 | Susse ................. B62K 19/32 |
| 2020/0025253 | A1* | 1/2020 | Werner ............... F16C 33/208 |

FOREIGN PATENT DOCUMENTS

| | | |
|---|---|---|
| CN | 101648573 B | 2/2011 |
| CN | 102510957 A | 6/2012 |
| DE | 102013019566 A1 | 5/2015 |
| EP | 3031708 A1 | 6/2016 |
| JP | H07269562 A | 10/1995 |
| JP | H07279948 A | 10/1995 |
| JP | 10122233 A * | 5/1998 |
| JP | 2004225754 A | 8/2004 |
| JP | 2006513374 A | 4/2006 |
| KR | 100976867 B1 | 8/2010 |
| RU | 2276749 C2 | 5/2006 |
| WO | 9916663 A1 | 4/1999 |
| WO | 2005050039 A1 | 6/2005 |

\* cited by examiner

ASSEMBLY FOR A BEARING AND METHODS OF MAKING AND USING THE SAME

CROSS-REFERENCE TO RELATED APPLICATIONS

This Application is a National Stage entry under 35 U.S.C. § 371 of International Application No. PCT/US2018/053292, filed Sep. 28, 2018, entitled "ASSEMBLY FOR A BEARING AND METHODS OF MAKING AND USING THE SAME," by Lukas PLIOSKA et al., which claims priority to U.S. Provisional Patent Application No. 62/564,856, filed Sep. 28, 2017, entitled "ASSEMBLY FOR A BEARING AND METHODS OF MAKING AND USING THE SAME," by Lukas PLIOSKA et al., and claims priority to U.S. Provisional Patent Application No. 62/581,122, filed Nov. 3, 2017, entitled "ASSEMBLY FOR A BEARING AND METHODS OF MAKING AND USING THE SAME," by Lukas PLIOSKA et al., which all applications are assigned to the current assignee hereof and incorporated herein by reference in their entireties.

TECHNICAL FIELD

This disclosure relates to bearing assemblies and methods of making and using the same. By non-limiting example, the assembly can be used in a bearing for a steering assembly.

BACKGROUND

Bearing assemblies are used in a wide variety of applications including radial applications where relative movement is managed between inner and outer components such as a shaft and a housing. They can take numerous forms including ball bearings containing bearing balls, roller bearings including needle and tapered roller bearings.

One application relates to motorcycles, bicycles, and UTV/ATV type vehicles that utilize a steering assembly including a steerer tube that extends through a frame portion, often the head tube, of the vehicle. The positional relationship of the steerer tube to the frame is generally fixed by use of bearings, which fix the radial and longitudinal positions of the steerer tube, but which allow rotational movement of the steerer tube. Various constructions are known in the art, but a need in the art continues to exist for improved bearings, bearing assemblies and steering assemblies.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF THE PREFERRED EMBODIMENT(S)

Figure 2:
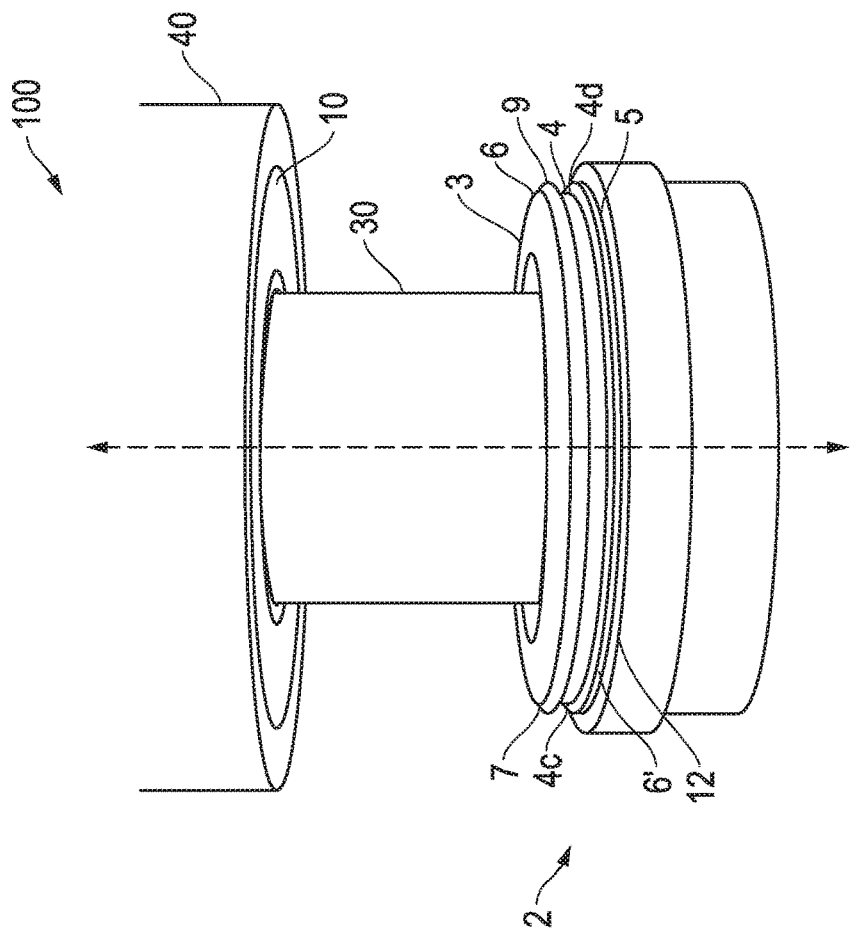
FIG. 2 is an exploded perspective view of an assembly including an assembly according to an embodiment of the invention.
Figure 1:
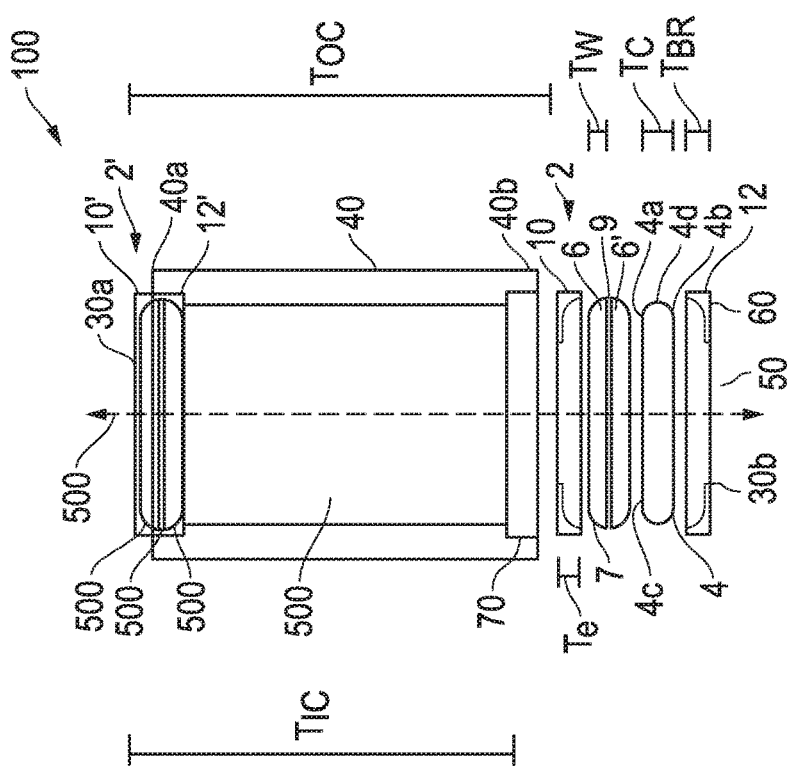
FIG. 1 is perspective view of an assembly including an assembly according to an embodiment of the invention.

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item. Also, the use of "about" or "substantially" is employed to convey spatial or numerical relationships that describe any value or relationship that does not depart from the scope of the invention.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the bearing assembly and tolerance ring arts.

Embodiments of an assembly and methods of making and using the same are disclosed in FIGS. 1-10. FIGS. 1-4 illustrate an assembly 2 in accordance with a number of embodiments. The assembly 2 may be a bearing assembly or bushing assembly 2 in accordance with a number of embodiments. In a number of embodiments, the bearing assembly 2 may be a plain bearing. In a number of embodiments, the bearing 2 may be a sliding bearing. In a number of embodiments, the bearing assembly 2 may be disposed within or adjacent to an assembly 100. In a number of embodiments, the assembly 100 may be a steering assembly. In a number of embodiments, the bearing assembly 2 may extend in the axial direction relative to a central axis 500. The central axis 500 may be longitudinal down the length of the bearing assembly 2. The bearing assembly 2 may include a first axial end or edge 3 and a second axial end or edge 5. The bearing assembly 2 may have a first outer radial end or edge 7 and a second outer radial end or edge 9. Still referring to FIG. 1, the bearing assembly 2 may include a bore 50. The bore 50 may run down the axial length of the bearing assembly 2 and be adapted to couple to another component of the assembly 100. The bore 50 may be parallel or planar to the central axis 500.

Still referring to FIGS. 1-4, a bearing assembly 2 may include a core 4. In a number of embodiments, the bearing assembly 2 may include at least one washer 6. The core 4 may be toroidal, such as having a generally torus-shaped. In a number of embodiments, the core 4 may be in the form or shape of a toroid. In a number of embodiments, the core 4 may have a first axial end 4a and a second axial end 4b. The core 4 may have an inner radial end 4c and an outer radial end 4d. The core 4 may have an inner radius $IR_C$, from the central axis 500 to the inner radial end 4c. The core 4 may have an outer radius $OR_C$, from the central axis 500 to the outer radial end 4d. The core 4 may have a thickness $T_{C\,from}$ the first axial end 4a to the second axial end 4b. In a number of embodiments, the core 4 may be rigid. In a number of embodiments, the core 4 may be solid. In a number of embodiments, the core 4 may be made of a material conventional in the art such as, but not limited to, a metal or metal alloy, a ceramic, a polymer, or a composite material. In a number of embodiments, the core 4 can at least partially include a metal which may include aluminum, zinc, copper, magnesium, tin, platinum, titanium, tungsten, iron, bronze, alloys thereof, any combination thereof, or may be another type. More particularly, core 4 can at least partially include a steel, such as a stainless steel or spring steel. For example, the core 4 can at least partially include a 301 stainless steel. The 301 stainless steel may be annealed, ¼ hard, ½ hard, ¾ hard, or full hard. In a number of embodiments, the core 4 may be a polymer such as a polyketone, a polyaramide, a polyimide, a polytherimide, a polyphenylene sulfide, a polyetherslfone, a polysulfone, a polypheylene sulfone, a polyamideimide, ultra high molecular weight polyethylene, a fluoropolymer, a polyamide, a polybenzimidazole, elastomers (including but not limited to, rubber, or silicone based elastomers), thermoset materials, or any combination thereof. In an example, the core 4 can at least partially include a polyketone, a polyaramide, a polyimide, a polyetherimide, a polyamideimide, a polyphenylene sulfide, a polyphenylene sulfone, a fluoropolymer, a polybenzimidazole, a derivation thereof, or a combination thereof. In a particular example, the low friction/wear resistant layer includes a polymer, such as a polyketone, a thermoplastic polyimide, a polyetherimide, a polyphenylene sulfide, a polyether sulfone, a polysulfone, a polyamideimide, a derivative thereof, or a combination thereof. In a further example, the low friction/wear resistant layer includes polyketone, such as polyether ether ketone (PEEK), polyether ketone, polyether ketone ketone, polyether ketone ether ketone, a derivative thereof, or a combination thereof. In an additional example, the low friction/wear resistant layer may be an ultra high molecular weight polyethylene.

An example fluoropolymer includes fluorinated ethylene propylene (FEP), polytetrafluoroethylene (PTFE), polyvinylidene fluoride (PVDF), perfluoroalkoxy (PFA), a terpolymer of tetrafluoroethylene, hexafluoropropylene, and vinylidene fluoride (THV), polychlorotrifluoroethylene (PCTFE), ethylene tetrafluoroethylene copolymer (ETFE), ethylene chlorotrifluoroethylene copolymer (ECTFE), polyacetal, polybutylene terephthalate (PBT), polyethylene terephthalate (PET), polyimide (PI), polyetherimide, polyetheretherketone (PEEK), polyethylene (PE), polysulfone, polyamide (PA), polyphenylene oxide, polyphenylene sulfide (PPS), polyurethane, polyester, liquid crystal polymers (LCP), any combination thereof, or may be another type. In a number of embodiments, the core 4 can at least partially include a ceramic including, but not limited to, barium titanate, bismuth strontium calcium copper oxide, boron oxide, boron nitride, earthenware, ferrite, magnesium diboride, porcelain, silicon carbide, silicon nitride, titanium carbide, zinc oxide, zirconium dioxide, stone ware, bone china, any combination thereof, or may be another type. The core 4 may be formed and manufactured according to known techniques in the bearing arts. In a number of embodiments, the core 4 may be torus-shaped. In a number of embodiments, the core 4 may have a circular, polygonal, oval, or semi-circular cross-sectional shape, or a combination of shapes.

In a number of embodiments, the core 4 may have an outer radius $OR_C$, from the central axis 500 to the outer radial end 4d, and $OR_C$ can be ≥0.5 mm, such as ≥1 mm, ≥5 mm, ≥10 mm, ≥15 mm, or ≥20 mm. The $OR_C$ can be ≤45 mm, such as ≤40 mm, such as ≤35 mm, such as ≤30 mm, ≤20 mm, ≤15 mm, ≤10 mm, or ≤5 mm.

In a number of embodiments, the core 4 may have an inner radius $IR_C$, from the central axis 500 to the inner radial end 4c, and $IR_C$ can be ≥1 mm, such as ≥5 mm, ≥7.5 mm, ≥10 mm, ≥15 mm, or ≥20 mm. The $IR_C$ can be ≤20 mm, such as ≥15 mm, ≥10 mm, ≥7.5 mm, ≥5 mm, or ≥1 mm. In a number of embodiments, the core 4 may have a length $L_C$ measured between the inner radius $IR_C$ and the outer radius $OR_C$.

In a number of embodiments, the core 4 can have an overall thickness, $T_C$ from first axial end 3 to the second axial end 5, and $T_C$ can be ≥0.5 mm, ≥0.75 mm, ≥1 mm, ≥2 mm, ≥5 mm, or ≥10 mm. $T_C$ can be ≤10 mm, such as ≤7.5 mm, ≤5 mm, ≤2.5 mm, or ≤1 mm.

Still referring to FIGS. 1-6, a bearing assembly 2 may include at least one washer 6. The at least one washer 6 may overlie or be disposed adjacent to the core 4. The at least one washer 6 may have an arcuate cross-section. In a number of embodiments, the at least one washer 6 may have an arcuate cross-section so as to have a shape complementary to the core 4. The at least one washer 6 may be adapted to provide a normal force to surfaces of at least one of the bearing assembly 2, or the assembly 100. In a number of embodiments, the at least one washer 6 may have a first axial end 6a and a second axial end 6b. The at least one washer 6 may have an inner radial end 6c and an outer radial end 6d. The at least one washer 6 may have an inner radius $IR_W$, from the central axis 500 to the inner radial end 6c. The at least one washer 6 may have an outer radius $OR_W$, from the central axis 500 to the outer radial end 6d. The at least one washer 6 may have a thickness $T_W$ from the first axial end 6a to the second axial end 6b. In a number of embodiments, the at least one washer 6 may be rigid. In a number of embodiments, the core 4 may be solid. In a number of embodiments, the at least one washer 6 may be made of a material conventional in the art such as, but not limited to, a metal or metal alloy, a ceramic, a polymer, or a composite material. In a number of embodiments, the at least one washer 6 can at least partially include a metal which may include aluminum, zinc, copper, magnesium, tin, platinum, titanium, tungsten, iron, bronze, alloys thereof, any combination thereof, or may be another type. More particularly, at least one washer 6 can at least partially include a steel, such as a stainless steel or spring steel. For example, the at least one washer 6 can at least partially include a 301 stainless steel. The 301 stainless steel may be annealed, ¼ hard, ½ hard, ¾ hard, or full hard. In a number of embodiments, the at least one washer 6 may be a polymer such as a polyketone, a polyaramide, a polyimide, a polytherimide, a polyphenylene sulfide, a polyetherslfone, a polysulfone, a polypheylene sulfone, a polyamideimide, ultra high molecular weight polyethylene, a fluoropolymer, a polyamide, a polybenzimidazole, or any combination thereof. In an example, the torus-shaped core 4 can at least partially include a polyketone, a polyaramide, a polyimide, a polyetherimide, a polyamideimide, a polyphenylene sulfide, a polyphenylene sulfone, a fluoropolymer, a polybenzimidazole, a derivation thereof, or a combination thereof. In a particular example, the low friction/wear resistant layer includes a polymer, such as a polyketone, a thermoplastic polyimide, a polyetherimide, a polyphenylene sulfide, a polyether sulfone, a polysulfone, a polyamideimide, a derivative thereof, or a combination thereof. In a further example, the low friction/wear resistant layer includes polyketone, such as polyether ether ketone (PEEK), polyether ketone, polyether ketone ketone, polyether ketone ether ketone, a derivative thereof, or a combination thereof. In an additional example, the low friction/wear resistant layer may be an ultra high molecular weight polyethylene. An example fluoropolymer includes fluorinated ethylene propylene (FEP), polytetrafluoroethylene (PTFE), polyvinylidene fluoride (PVDF), perfluoroalkoxy (PFA), a terpolymer of tetrafluoroethylene, hexafluoropropylene, and vinylidene fluoride (THV), polychlorotrifluoroethylene (PCTFE), ethylene tetrafluoroethylene copolymer (ETFE), ethylene chlorotrifluoroethylene copolymer (ECTFE), polyacetal, polybutylene terephthalate (PBT), polyethylene terephthalate (PET), polyimide (PI), polyetherimide, polyetheretherketone (PEEK), polyethylene (PE), polysulfone, polyamide (PA), polyphenylene oxide, polyphenylene sulfide (PPS), polyurethane, polyester, liquid crystal polymers (LCP), any combination thereof, or may be another type. In a number of embodiments, the at least one washer 6 can at least partially include a ceramic including, but not limited to, barium titanate, bismuth strontium calcium copper oxide, boron oxide, boron nitride, earthenware, ferrite, magnesium diboride, porcelain, silicon carbide, silicon nitride, titanium carbide, zinc oxide, zirconium dioxide, stone ware, bone china, any combination thereof, or may be another type. The at least one washer 6 may be formed and manufactured according to known techniques in the bearing arts. In a number of embodiments, the at least one washer 6 may be torus-shaped. In a number of embodiments, the at least one washer 6 may have a circular, polygonal, oval, or semi-circular cross-sectional shape. In a number of embodiments, the at least one washer 6 may be curved or contoured. In a number of embodiments, the at least one washer 6 may have a half-round cross-sectional shape. In a number of embodiments, the at least one washer 6 may have a radius of curvature between about 1.6 mm to about 900 mm. In a number of embodiments, the at least one washer 6 may have a spring rate of at least about 10 N/mm, about 25 N/mm, about 50 N/mm, about 100 N/mm, or about 200 N/mm.

In a number of embodiments, the at least one washer 6 may have an outer radius $OR_W$, from the central axis 500 to the outer radial end 6d, and $OR_W$ can be ≥0.5 mm, such as ≥1 mm, ≥5 mm, ≥10 mm, ≥15 mm, or ≥20 mm. The $OR_W$ can be ≤45 mm, such as ≤40 mm, such as ≤35 mm, such as ≤30 mm, ≤20 mm, ≤15 mm, ≤10 mm, or ≤5 mm.

In a number of embodiments, the at least one washer 6 may have an inner radius $IR_W$, from the central axis 500 to the inner radial end 6c, and $IR_W$ can be ≥1 mm, such as ≥5 mm, ≥7.5 mm, ≥10 mm, ≥15 mm, or ≥20 mm. The $IR_W$ can be ≤20 mm, such as ≤15 mm, ≤10 mm, ≤7.5 mm, ≤5 mm, or ≤1 mm. In a number of embodiments, the at least one washer 6 may have a length $L_W$ measured between the inner radius $IR_W$ and the outer radius $OR_W$.

In a number of embodiments, the at least one washer 6 can have an overall thickness $T_W$ from the first axial end 6a to the second axial end 6b, and $T_W$ can be ≥0.5 mm, ≥0.75 mm, ≥1 mm, ≥2 mm, ≥5 mm, or ≥10 mm. $T_W$ can be ≤10 mm, such as ≤7.5 mm, ≤5 mm, ≤2.5 mm, or ≤1 mm.

Figure 10:
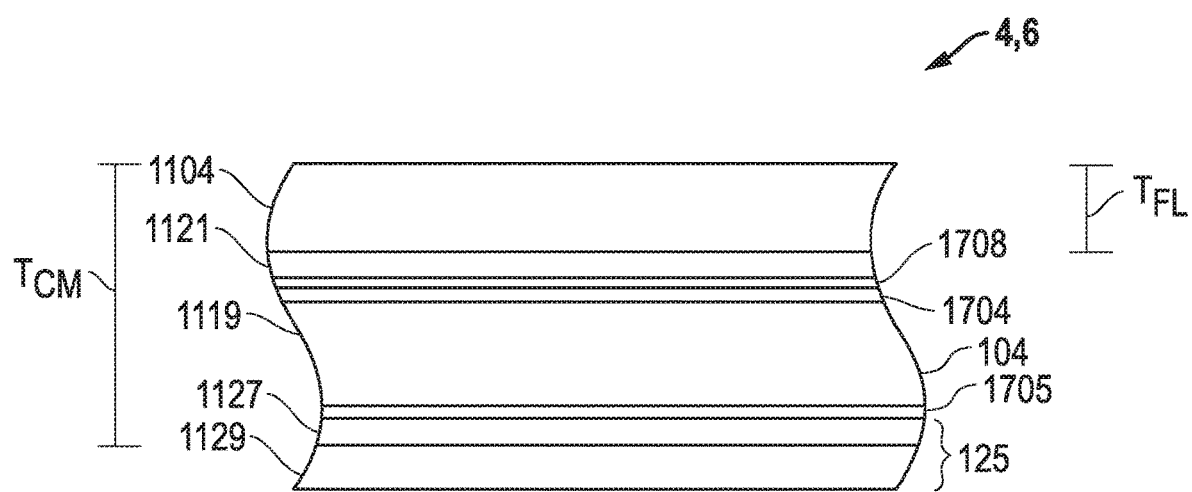
FIG. 10 is a perspective view of a possible material composition for a washer for N assembly according to an embodiment of the invention.

In a number of embodiments, as shown in FIG. 10, at least one of the core 4 or the at least one washer 6 can include a composite material having a thickness $T_{CM}$. In a number of embodiments, at least one of the core 4 or the at least one washer 6 may include a substrate 1119. In a number of embodiments, the substrate may include a metal strip 1119. In a number of embodiments, at least one of the core 4 or the at least one washer 6 may include a low friction layer 1104. The low friction layer 1104 can be coupled to at least a portion of the metal strip 1119. In a particular embodiment, the low friction layer 1104 can be coupled to a surface of the metal strip 1119 so as to form a low friction interface with another surface of another component. In a particular embodiment, the low friction layer 1104 can be coupled to the radially inner surface of the metal strip 1119 so as to form a low friction interface with another surface of another component. In a particular embodiment, the low friction layer 1104 can be coupled to the radially outer surface of the metal strip 1119 so as to form a low friction interface with another surface of another component (such as an inner member 30 or outer member 40).

In an embodiment, the substrate or metal strip 1119 can at least partially include a metal. The metal may include aluminum, zinc, copper, magnesium, tin, platinum, titanium, tungsten, iron, bronze, alloys thereof, or may be another type. More particularly, the substrate or metal strip 1119 can at least partially include a steel, such as a stainless steel or spring steel. For example, the substrate can at least partially include a 301 stainless steel. The 301 stainless steel may be annealed, ¼ hard, ½ hard, ¾ hard, or full hard. The metal strip 1119 may include a woven mesh or an expanded metal grid. Alternatively, the woven mesh can be a woven polymer mesh. In an alternate embodiment, the metal strip 1119 may not include a mesh or grid. In another alternate embodiment, the metal strip 1119, as a solid component, woven mesh or expanded metal grid, may be embedded between at least one adhesive layer 1121 included between the low friction layer 1104 and the metal strip 1119. In at least one embodiment, the metal strip 1119 may be any kind of metal alloy which provides an elastic behavior under application load in an arcuate shape.

Optionally, at least one of the core 4 or the at least one washer 6 may include at least one adhesive layer 1121 that may couple the low friction layer 1103 to the metal strip 1119. The adhesive layer 1121 may include any known adhesive material common to the ring arts including, but not limited to, fluoropolymers, epoxy resins, polyimide resins, polyether/polyamide copolymers, ethylene vinyl acetates, ethylene tetrafluoroethylene (ETFE), ETFE copolymer, perfluoroalkoxy (PFA), or any combination thereof. Additionally, the adhesive can include at least one functional group selected from —C=O, —C—O—R, —COH, —COOH, —COOR, —CF$_2$=CF—OR, or any combination thereof, where R is a cyclic or linear organic group containing between 1 and 20 carbon atoms. Additionally, the adhesive can include a copolymer. In an embodiment, the hot melt adhesive can have a melting temperature of not greater than 250° C., such as not greater than 220° C. In another embodiment, the adhesive may break down above 200° C., such as above 220° C. In further embodiments, the melting temperature of the hot melt adhesive can be higher than 250° C. or even higher than 300° C. The adhesive layer 1121 can have a thickness of about 1 to 50 microns, such as about 7 to 15 microns.

Optionally, the metal strip 1119 may be coated with corrosion protection layers 1704 and 1705 to prevent corrosion of at least one of the core 4 or the at least one washer 6 prior to processing. Additionally, a corrosion protection layer 1708 can be applied over layer 1704. Each of layers 1704, 1705, and 1708 can have a thickness of about 1 to 50 microns, such as about 7 to 15 microns. Layers 1704 and 1705 can include a phosphate of zinc, iron, manganese, or any combination thereof, or a nano-ceramic layer. Further, layers 1704 and 1705 can include functional silanes, nano-scaled silane based primers, hydrolyzed silanes, organosilane adhesion promoters, solvent/water based silane primers, chlorinated polyolefins, passivated surfaces, commercially available zinc (mechanical/galvanic) or zinc-nickel coatings, or any combination thereof. Layer 1708 can include functional silanes, nano-scaled silane based primers, hydrolyzed silanes, organosilane adhesion promoters, solvent/water based silane primers. Corrosion protection layers 1704, 1706, and 1708 can be removed or retained during processing.

Optionally, at least one of the core 4 or the at least one washer 6 may further include a corrosion resistant coating 1125. The corrosion resistant coating 1125 can have a thickness of about 1 to 50 microns, such as about 5 to 20 microns, and such as about 7 to 15 microns. The corrosion resistant coating can include an adhesion promoter layer 127 and an epoxy layer 129. The adhesion promoter layer 1127 can include a phosphate of zinc, iron, manganese, tin, or any combination thereof, or a nano-ceramic layer. The adhesion promoter layer 1127 can include functional silanes, nano-scaled silane based layers, hydrolyzed silanes, organosilane adhesion promoters, solvent/water based silane primers, chlorinated polyolefins, passivated surfaces, commercially available zinc (mechanical/galvanic) or Zinc-Nickel coatings, or any combination thereof. The epoxy layer 1129 can be a thermal cured epoxy, a UV cured epoxy, an IR cured epoxy, an electron beam cured epoxy, a radiation cured epoxy, or an air cured epoxy. Further, the epoxy resin can include polyglycidylether, diglycidylether, bisphenol A, bisphenol F, oxirane, oxacyclopropane, ethylenoxide, 1,2-epoxypropane, 2-methyloxirane, 9,10-epoxy-9,10-dihydroanthracene, or any combination thereof. The epoxy resin layer 1129 can further include a hardening agent. The hardening agent can include amines, acid anhydrides, phenol novolac hardeners such as phenol novolac poly[N-(4-hydroxyphenyl)maleimide] (PHPMI), resole phenol formaldehydes, fatty amine compounds, polycarbonic anhydrides, polyacrylate, isocyanates, encapsulated polyisocyanates, boron trifluoride amine complexes, chromic-based hardeners, polyamides, or any combination thereof. Generally, acid anhydrides can conform to the formula R—C=O—O—C=O—R' where R can be $C_xH_yX_zA_U$ as described above. Amines can include aliphatic amines such as monoethylamine, diethylenetriamine, triethylenetetraamine, and the like, alicyclic amines, aromatic amines such as cyclic aliphatic amines, cyclo aliphatic amines, amidoamines, polyamides, dicyandiamides, imidazole derivatives, and the like, or any combination thereof.

In a number of embodiments, the low friction layer 1104 of at least one of the core 4 or the at least one washer 6 can comprise materials including, for example, a polymer, such as a polyketone, a polyaramide, a polyimide, a polytherimide, a polyphenylene sulfide, a polyetherslfone, a polysulfone, a polypheylene sulfone, a polyamideimide, ultra high molecular weight polyethylene, a fluoropolymer, a polyamide, a polybenzimidazole, or any combination thereof. In an example, the low friction layer 1104 includes a polyketone, a polyaramide, a polyimide, a polyetherimide, a polyamideimide, a polyphenylene sulfide, a polyphenylene sulfone, a fluoropolymer, a polybenzimidazole, a derivation thereof, or a combination thereof. In a particular example, the low friction/wear resistant layer includes a polymer, such as a polyketone, a thermoplastic polyimide, a polyetherimide, a polyphenylene sulfide, a polyether sulfone, a polysulfone, a polyamideimide, a derivative thereof, or a combination thereof. In a further example, the low friction/wear resistant layer includes polyketone, such as polyether ether ketone (PEEK), polyether ketone, polyether ketone ketone, polyether ketone ether ketone, a derivative thereof, or a combination thereof. In an additional example, the low friction/wear resistant layer may be an ultra high molecular weight polyethylene. An example fluoropolymer includes fluorinated ethylene propylene (FEP), polytetrafluoroethylene (PTFE), polyvinylidene fluoride (PVDF), perfluoroalkoxy (PFA), a terpolymer of tetrafluoroethylene, hexafluoropropylene, and vinylidene fluoride (THV), polychlorotrifluoroethylene (PCTFE), ethylene tetrafluoroethylene copolymer (ETFE), ethylene chlorotrifluoroethylene copolymer (ECTFE), polyacetal, polybutylene terephthalate (PBT), polyethylene terephthalate (PET), polyimide (PI), polyetherimide, polyetheretherketone (PEEK), polyethylene (PE), polysulfone, polyamide (PA), polyphenylene oxide, polyphenylene sulfide (PPS), polyurethane, polyester, liquid crystal polymers (LCP), or any combination thereof. The low friction layer 1104 may include a solid based material including lithium soap, graphite, boron nitride, molybdenum disulfide, tungsten disulfide, polytetrafluoroethylene, carbon nitride, tungsten carbide, or diamond like carbon, a metal (such as aluminum, zinc, copper, magnesium, tin, platinum, titanium, tungsten, iron, bronze, steel, spring steel, stainless steel), a metal alloy (including the metals listed), an anodized metal (including the metals listed) or any combination thereof. Fluoropolymers may be used according to particular embodiments. As used herein, a "low friction material" can be a material having a dry static coefficient of friction as measured against steel of less than 0.5, such as less than 0.4, less than 0.3, or even less than 0.2. A "high friction material" can be a material having a dry static coefficient of friction as measured against steel of greater than 0.6, such as greater than 0.7, greater than 0.8, greater than 0.9, or even greater than 1.0.

In a number of embodiments, the low friction layer 1104 may further include fillers, including glass fibers, carbon fibers, silicon, PEEK, aromatic polyester, carbon particles, bronze, fluoropolymers, thermoplastic fillers, aluminum oxide, polyamidimide (PAI), PPS, polyphenylene sulfone (PPSO2), LCP, aromatic polyesters, molybdenum disulfide, tungsten disulfide, graphite, graphene, expanded graphite, boron nitride, talc, calcium fluoride, or any combination thereof. Additionally, the filler can include alumina, silica, titanium dioxide, calcium fluoride, boron nitride, mica, Wollastonite, silicon carbide, silicon nitride, zirconia, carbon black, pigments, or any combination thereof. Fillers can be in the form of beads, fibers, powder, mesh, or any combination thereof.

In an embodiment, the low friction layer 1104 can have a thickness $T_{FL}$ in a range of 0.01 mm and 1.5 mm, such as in a range of 0.15 mm and 1.35 mm, or even in a range of 0.2 mm and 1.25 mm. In an embodiment, the thickness of the low friction 1104 may be uniform, i.e., a thickness at a first location of the low friction layer 1104 can be equal to a thickness at a second location there along. In an embodiment at least one of the core 4 or the at least one washer 6 may include a metal strip 1119, which may be formed with the low friction layer 1104 at the outer side 109 of the sidewall 104. In an embodiment, at least one of the core 4 or the at least one washer 6 may include a metal strip 1119, which may be formed with the low friction layer 1104 on its surface. In a number of embodiments, the metal strip 1119 may extend at least partially along a length of at least one of the core 4 or the at least one washer 6. The metal strip 1119 may be at least partially encapsulated by the low friction or low friction layer 1104. That is, the low friction or low friction layer 1104 may cover at least a portion of the metal strip 1119. Axial ends of the metal strip 1119 may or may not be exposed from the low friction or low friction layer 1104. In a particular embodiment, the metal strip 1119 may be fully encapsulated in the low friction or low friction layer 1104 such that the metal strip 1119 may not be visibly perceptible. In another embodiment, the metal strip 1119 may include an aperture extending at least partially into the low friction or low friction layer 1104. The aperture can generally reduce stiffness of at least one of the core 4 or the at least one washer 6, thereby allowing a specific engineered stiffness profile.

In an embodiment, any of the layers on at least one of the core 4 or the at least one washer 6, as described above, can each be disposed in a roll and peeled therefrom to join together under pressure, at elevated temperatures (hot or cold pressed or rolled), by an adhesive, or by any combination thereof. In a number of embodiments, any of the layers of at least one of the core 4 or the at least one washer 6, as described above, may be laminated together such that they at least partially overlap one another. In a number of embodiments, any of the layers on the at least one of the core 4 or the at least one washer 6, as described above, may be applied together using coating technique, such as, for example, physical or vapor deposition, spraying, plating, powder coating, or through other chemical or electrochemical techniques. In a particular embodiment, the low friction layer 1104 may be applied by a roll-to-roll coating process, including for example, extrusion coating. The low friction layer 1104 may be heated to a molten or semi-molten state and extruded through a slot die onto a major surface of the metal strip 1119. In another embodiment, the low friction layer 1104 may be cast or molded.

In other embodiments, any of the layers on at least one of the core 4 or the at least one washer 6, as described above, may be applied by a coating technique, such as, for example, physical or vapor deposition, spraying, plating, powder coating, or through other chemical or electrochemical techniques. In a particular embodiment, the low friction layer 1104 may be applied by a roll-to-roll coating process, including for example, extrusion coating. The low friction layer 1104 may be heated to a molten or semi-molten state and extruded through a slot die onto a major surface of the substrate or metal strip 1119. In another embodiment, the low friction layer 1104 may be cast or molded.

By way of a non-limiting example, at least one of the core 4 or the at least one washer 6 can be shaped in a jig. As stated above, in this regard, a strip of resilient material can be bent on the jig at desired locations to form bent portions. The strip of resilient material can comprise the substrate 1119 including a metal (such as aluminum, zinc, copper, magnesium, tin, platinum, titanium, tungsten, iron, bronze, steel, spring steel, stainless steel), a metal alloy (including the metals listed), an anodized metal (including the metals listed) or any combination thereof. In a non-limiting embodiment, the strip of resilient material can additionally, or alternatively, include a low friction layer 1104 including a polymer, or a polymer coating disposed on the resilient material or substrate. In a number of embodiments, alternative materials can be used along the circumference of at least one of the core 4 or the at least one washer 6.

In a number of embodiments, at least one of the core 4 or the at least one washer 6 may include at least one notched region 115. The notched region 115 may be free of the low friction layer 1104 or polymer. In other words, in some embodiments, the notched region 115 may only include the substrate 1119 or metal strip. In a number of embodiments, the notched region 115 may trap grease or lubricant in the bearing assembly 2.

Figure 4:
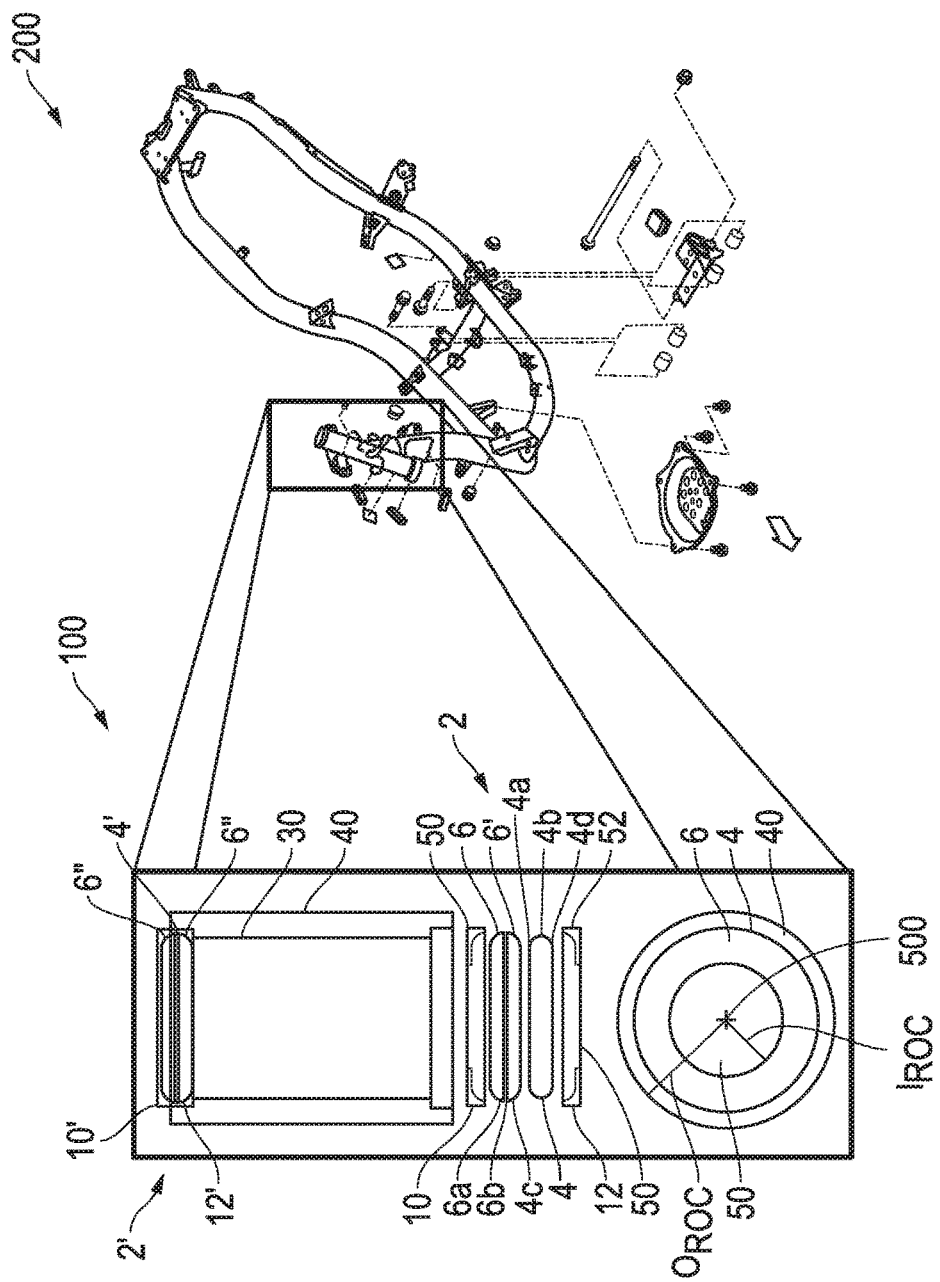
FIG. 4 is a perspective view of an assembly including an assembly according to an embodiment of the invention.
Figure 3:
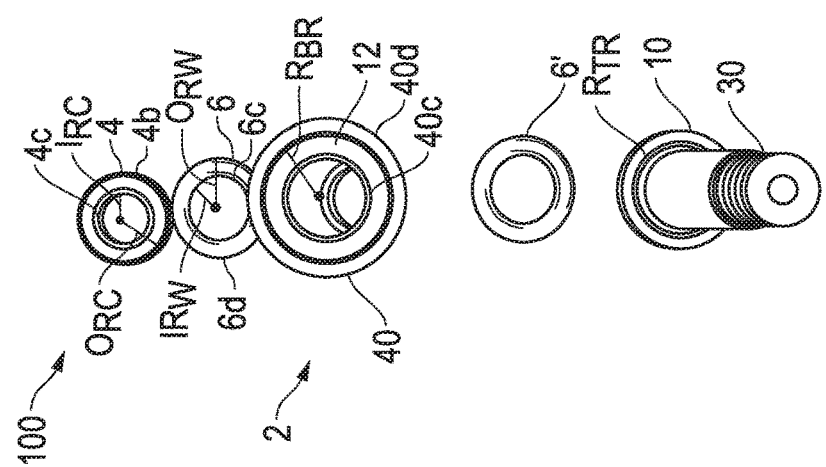
FIG. 3 is an exploded perspective view an assembly including an assembly according to an embodiment of the invention.
Figure 5:
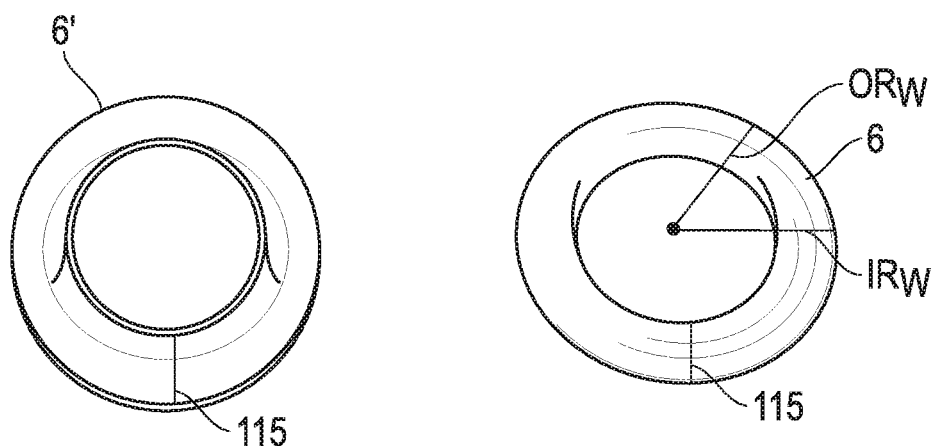
FIG. 5 is a perspective view of a washer for an assembly according to an embodiment of the invention.
Figure 6:
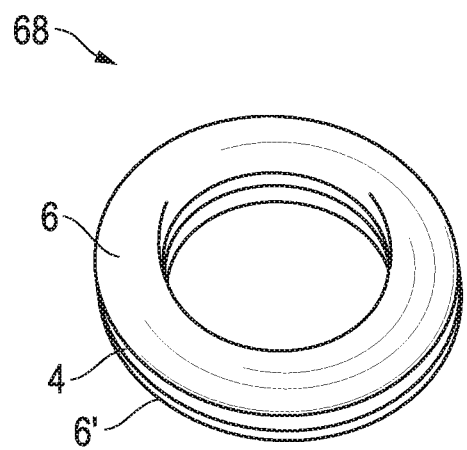
FIG. 6 is a perspective view of an assembly according to an embodiment of the invention.
Figure 7:
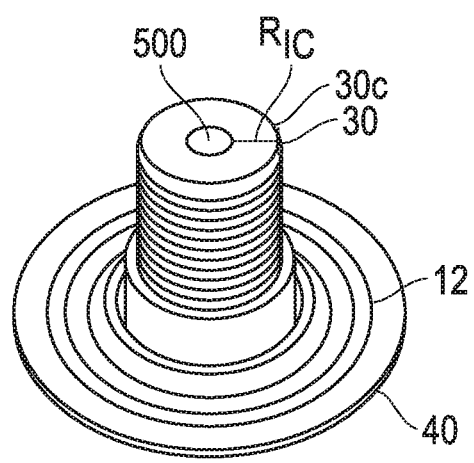
FIG. 7 is a perspective view of a shaft and an outer component for an assembly according to an embodiment of the invention.
Figure 8:
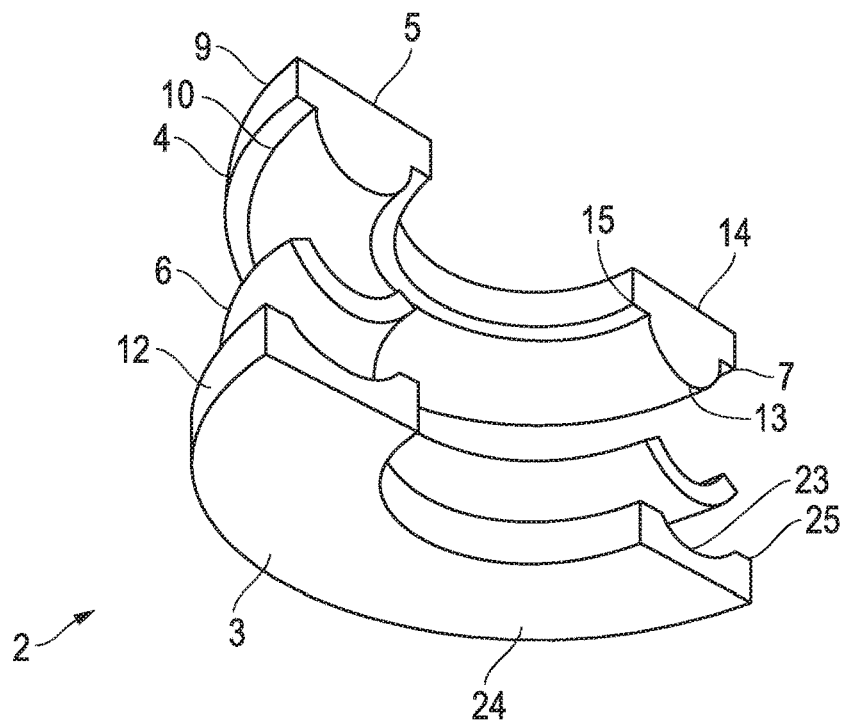
FIG. 8 is an exploded perspective view an assembly according to an embodiment of the invention.
Figure 9:
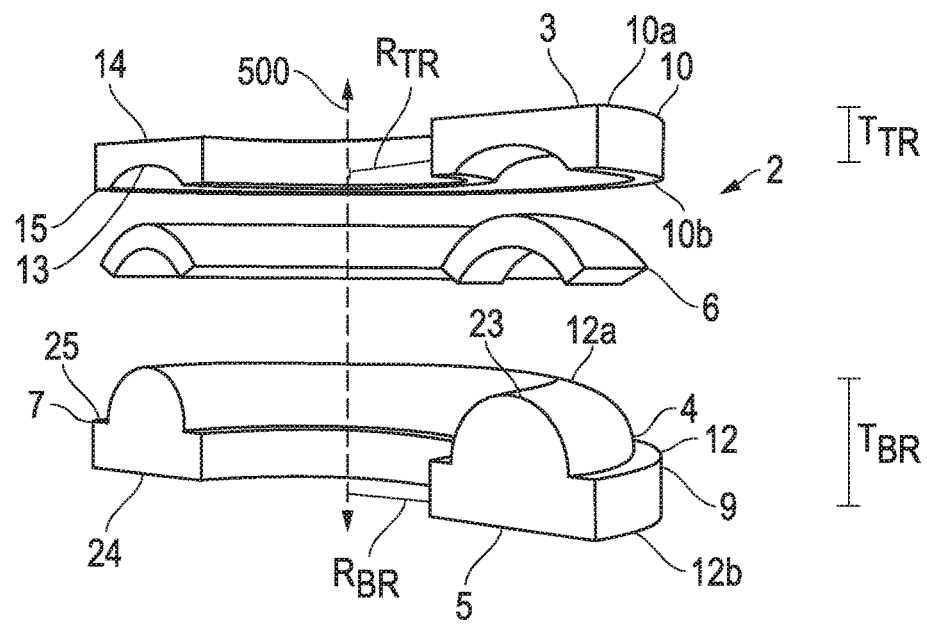
FIG. 9 is an exploded perspective view an assembly according to an embodiment of the invention.

Referring back to FIGS. 1-4, an assembly 100 is shown. The assembly 100 may include a core 4, and at least one washer 6. In a number of embodiments, the assembly 100 or the bearing assembly 2 may include a plurality of washers. In a number of embodiments, the assembly 100 or the bearing assembly 2 may include a first washer 6 and a second washer 6' that both overlie or are disposed adjacent to the core 4 where the first washer 6 overlies the core 4 on a first axial end 4a while the second washer 6' overlies the core 4 on a second axial end 4b relative to the central axis 50 of the bearing assembly 2. In a number of embodiments, the arcuate cross-section of the at least one washer 6, 6' may substantially encompass or surround the core 4. In a number of embodiments, the assembly 100 may include at least one race. In a number of embodiments, the assembly 100 may include a first race 10 and a second race 12. In a number of embodiments, the first race 10 may be a top race. In a number of embodiments, the second race 12 may be a bottom race. In a number of embodiments, the first race 10 may be a bottom race. In a number of embodiments, the second race 12 may be a top race. In a number of embodiments, the first race 10 and the second race 12 may substantially encompass or surround the core 4 and the at least one washer 6, 6' to form the assembly 100. In other words, the bearing assembly 2 may be disposed between the first race 10 and the second race 12 to form the assembly 100. In a number of embodiments, at least one of the at least one washer 6, 6' may form a single piece. In other words, the first washer 6 and the second washer 6' may form a single part or washer piece 6. In a number of embodiments, as shown in FIG. 8, the at least one first race 10 may comprise the core 4 while the second race 12 may comprise a concave surface. In a number of embodiments, as shown in FIG. 9, the at least one first race 10 may comprise a concave surface while the second race 12 may comprise the core 4. In a number of embodiments, as shown in FIG. 4, the assembly 100 may be a steering assembly for a vehicle 200. The assembly 100 may used in vehicles 200 including, but not limited to, bicycles, motorcycles, ATVs, cars, trucks, SUVs, aircraft, spacecraft, watercraft, or in other vehicles. Further, use of the assembly 100 or bearing assembly 2 may provide increased benefits in several applications such as, but not limited to, vehicle tail gates, door frames, seat assemblies, or other types of applications in vehicles 200.

In an embodiment, at least one of the first race 10, second piece 12 may include a metal or metal alloy. The metal can be a plate, a sheet, a woven fabric, a mesh, or metal foam. The metal can include steel, cold-rolled steel material No. 1.0338, cold-rolled steel material No. 1.0347, matt zinc-plated steel, stainless steel material No. 1.4512, stainless steel material No. 1.4720, stainless steel material No. 1.4310, aluminum, alloys, or any combinations thereof.

In another embodiment, the metal can have a coating. The coating can be a layer of another metal or alloy. In an embodiment, the coating may be a metal or alloy containing at least one of the following metals: chromium, molybdenum, tungsten, manganese, iron, ruthenium, osmium, cobalt, rhodium, iridium, nickel, palladium, platinum, copper, silver, gold, zinc, aluminum, gallium, indium, silicon, germanium, tin, antimony, and bismuth.

In an embodiment, as shown in FIGS. 8-9, the first race 10 may include a first face 13. The first race 10 may include a second face 14. The first race 10 may include a first circumferential flange 15 projecting radially from the first face 13. The radius of the first race 10 $R_{TR}$ may be at least 5 mm, at least 10 mm, at least 15 mm, at least 20 mm, at least 30 mm, at least 40 mm. The radius of the first race 10 $R_{TR}$ may be no greater than 5 mm, no greater than 10 mm, no greater than 15 mm, no greater than 20 mm, no greater than 30 mm, no greater than 40 mm. The first race 10 may have an inner radius and an outer radius consummate in scope to the values of the core 4 and washer 6 listed above. The first race 10 can have an axial thickness, $T_{TR}$, as measured between axial ends 10a and 10b, of no greater than 5 mm, no greater than 10 mm, no greater than 15 mm, no greater than 20 mm, no greater than 30 mm, no greater than 40 mm. The first race 10 can have an axial thickness, $T_{TR}$, as measured between axial ends 10a and 10b, of at least 5 mm, at least 10 mm, at least 15 mm, at least 20 mm, at least 30 mm, at least 40 mm. The first race 10 may be made of a material conventional in the art including those above, such as, but not limited to, a metal or metal alloy, a polymer, or a composite material. The first race may include an exterior surface 11. In a number of embodiments, the first race 10 may have an arcuate cross-section. In a number of embodiments, the first race 10 may have a convex surface on its first face 13 or second face 14 at its exterior surface 11. In a number of embodiments, the first race 10 may have a concave surface on its first face 13 or second face 14 at its exterior surface 11.

In an embodiment, as shown in FIGS. 8-9, the second race 12 may include a first face 23. The second race 12 may include a second face 24. The second race 12 may also include a first circumferential flange 25 projecting radially from the first face 23. The radius of the second race 12 $R_{BR}$ may be at least 5 mm, at least 10 mm, at least 15 mm, at least 20 mm, at least 30 mm, at least 40 mm. The radius of the second race 12 $R_{BR}$ may be no greater than 5 mm, no greater than 10 mm, no greater than 15 mm, no greater than 20 mm, no greater than 30 mm, no greater than 40 mm. The second race 12 may have an inner radius and an outer radius consummate in scope to the values of the core 4 and washer 6 listed above. The second race 12 can have an axial thickness, $T_{BR}$, as measured between axial ends 12a and 12b, of no greater than 5 mm, no greater than 10 mm, no greater than 15 mm, no greater than 20 mm, no greater than 30 mm, no greater than 40 mm. The second race 12 can have an axial thickness, $T_{BR}$, as measured between axial ends 12a and 12b, of at least 5 mm, at least 10 mm, at least 15 mm, at least 20 mm, at least 30 mm, at least 40 mm. The second race 12 may be made of a material conventional in the art including those above, such as, but not limited to, a metal or metal alloy, a polymer, or a composite material. The second race 12 may include an exterior surface 13. In a number of embodiments, the second race 12 may have a convex surface on its first face 23 or second face 24 at its exterior surface 13. In a number of embodiments, the second race 12 may have a concave surface on its first face 13 or second face 14 at its exterior surface 13. In a number of embodiments, the first race 10 and the second race 12 may substantially enclose the bearing assembly 2.

In a number of embodiments, the assembly 100 may further include an inner component or shaft 30 and an outer component or housing 40. In a number of embodiments, the shaft 30 may extend through the outer component 40. In a number of embodiments, the shaft 30 and outer component 40 may be capable of translating axially or radially with respect to one another. In a number of embodiments, the shaft 30 and outer component 40 may be capable of rotating with respect to one another. In a number of embodiments, at least one of the first race 10 or the second race 12 may be machined into the outer component 40. In a number of embodiments, the shaft 30 and outer component 40 may be made of a material conventional in the art including those above, such as, but not limited to, a metal or metal alloy, a polymer, or a composite material.

In a number of embodiments, the shaft 30 may have a first axial end 30a and a second axial end 30b. The shaft 30 may have a radius $R_{IC}$, from the central axis 500 to a radial end 30c. The shaft 30 may have a thickness $T_{IC}$ from the first axial end 30a to the second axial end 30b.

In a number of embodiments, the outer component 40 may have a first axial end 40a and a second axial end 40b. The outer component 40 may have an inner radial end 40c and an outer radial end 40d. The outer component 40 may have an inner radius $IR_{OC}$, from the central axis 500 to the inner radial end 40c. The outer component 40 may have an outer radius $OR_{OC}$, from the central axis 500 to the outer radial end 30d. The outer component 40 may have a thickness $T_{OC}$ from the first axial end 30a to the second axial end 30b. In a number of embodiments, the bearing assembly 2 and/or the first race 10 and the second race 12 may be located at the first axial end 40a of the outer component 40. In a number of embodiments, as shown in FIGS. 1-4, the bearing assembly 2 and/or the first race 10 and the second race 12 may be located at the second axial end 40b of the outer component 40. In a number of embodiments, the assembly 100 may include a plurality of bearing assemblies 2, 2' with a plurality of cores 4, 4', and at least one washer 6, 6', 6", 6'". In a number of embodiments, the first bearing assembly 2, may include a primary first race 10 and a primary second race 12 while the second bearing assembly 2' may include a secondary first race 10' and a secondary second race 12'. In a number of embodiments, the primary first race 10 and the primary second race 12 may be located at the first axial end 40a of the outer component 40. In a number of embodiments, the primary first race 10 and the primary second race 12 may enclose a bearing assembly 2 at the first axial end 40a of the outer component 40. In a number of embodiments, the secondary first race 10' and the secondary second race 12' may be located at the first axial end 40a of the outer component 40. In a number of embodiments, the secondary first race 10' and the secondary second race 12' may enclose a bearing assembly '2 at the second axial end 40b of the outer component 40. In a number of embodiments, bearing assemblies 2, 2' may be located at both the first axial end 40a and the second axial end 40b of the outer component 40.

In an embodiment, the first race 10 may include a first coupling component 50, and the second race 12 may include a second coupling component 52. The first coupling component 50 may pair with the second coupling component 52 to engage or couple the first race 10 to the second race 12 to at least partially surround the bearing assembly 2. The first coupling component 50 may include a male attachment and the second coupling component 52 can include a female attachment. In an embodiment, at least one of the first coupling component 50 or the second coupling component 52 may include engagement structures.

In an embodiment, the assembly 100 may include a locking mechanism 60. The locking mechanism 60 may pair with at least one of the first coupling component 50 and the second coupling component 52 to lock the first race 10 in place with respect to the second race 12. The locking mechanism 60 may include a pin, groove and stop, nut and bolt, nut and screw, latch, handle, locking nut, tie rivet, or may be locked another way.

In an embodiment, at least one of the first race 10 or the second race 12 may include an outer component connector 70. The outer component connector 70 may connect at least one of the first race 10 or the second race 12 to the outer component 40. In an embodiment, the outer component connector 70 may include engagement structures.

In an embodiment, the assembly 100 or bearing assembly 2 may be substantially free of lubricant. In another embodiment, the assembly 100 or bearing assembly 2 may include a lubricant on any of its components. The lubricant may include a grease including at least one of lithium soap, lithium disulfide, graphite, mineral or vegetable oil, silicone grease, fluorether-based grease, apiezon, food-grade grease, petrochemical grease, or may be a different type. The lubricant may include an oil including at least one of a Group I-Group III+ oil, paraffinic oil, naphthenic oil, aromatic oil, biolubricant, castor oil, canola oil, palm oil, sunflower seed oil, rapeseed oil, tall oil, lanolin, synthetic oil, polyalpha-olefin, synthetic ester, polyalkylene glycol, phosphate ester, alkylated naphthalene, silicate ester, ionic fluid, multiply alkylated cyclopentane, petrochemical based, or may be a different type. The lubricant may include a solid based lubricant including at least one of lithium soap, graphite, boron nitride, molybdenum disulfide, tungsten disulfide, polytetrafluoroethylene, a metal, a metal alloy, or may be a different type. The bearing assembly 2 may be entirely free of lubricant.

A method of assembling the assembly 100 is recited. The method may include providing an assembly 100 including a shaft 30, an outer component 40, at least one first race 10, at least one second race 12, and a bearing assembly 2. The bearing assembly 2 may include a core 4, and at last one washer 6 overlying the core, the washer 6 having a polymer, where the washer 6 has an arcuate cross-section. The method may further include positioning the bearing assembly 2 between the first race 10 and the second race 12. The method may further include providing a loading force on the bearing assembly 2 such that the bearing assembly 2 directs the loading force in the normal direction with respect to surfaces of the bearing assembly 2.

In an embodiment, the bearing assembly 2 can be installed or assembled by an assembly force of at least 1 kg in a direction parallel to the central axis 500, such as at least 2 kg, at least 3 kg, at least 4 kg, at least 5 kg, at least 10 kg, or even at least 15 kg. In a further embodiment, the bearing assembly 2 can be installed or assembled by an assembly force of no greater than 20 kg in a direction parallel to the central axis 500, such as no greater than 19 kg, no greater than 18 kg, no greater than 17 kg, or even no greater than 16 kg.

In an embodiment, the loading force may be at least 1 kg in a direction parallel to the central axis 500, such as at least 2 kg, at least 3 kg, at least 4 kg, at least 5 kg, at least 10 kg, or even at least 15 kg. In a further embodiment, the loading force may be no greater than 20 kg in a direction parallel to the central axis 500, such as no greater than 19 kg, no greater than 18 kg, no greater than 17 kg, or even no greater than 16 kg.

In an embodiment, the bearing assembly 2 may be substantially free of lubricant to increase the longevity of the bearing assembly 2 via the use of the at least one washer 20. In an embodiment, the bearing assembly 2 may be substantially noise free via the use of the at least one washer 20. In an embodiment, the bearing assembly may be provided with good performance over a range of conditions including temperature via the use of the at least one washer 20. In an embodiment, the bearing assembly may provide overload protection via the use of the at least one washer 20.

In a number of embodiments, the bearing assembly 2, assembly 100, or method (or any of its components) may provide loading forces normal to the bearing assembly 2 and any of its surfaces regardless of loading input. In a number of embodiments, the bearing assembly 2, assembly 100, or method (or any of its components) may provide full surface contact, axial centering, or tolerance compensation or misalignment of any of its components (including the outer component 40 and shaft 30). In a number of embodiments, the bearing assembly 2, assembly 100, or method (or any of its components) may reduce or eliminate brinelling of any of its components (including the outer component 40 and shaft 30). In a number of embodiments, the bearing assembly 2, assembly 100, or method (or any of its components) may provide a constant level of torque between any of its components (including the outer component 40 and shaft 30).

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the embodiments as listed below.

Embodiment 1

An assembly comprising: a core in the form of a toroid; and at least one washer overlying the core, the washer comprising a polymer, wherein the washer has an arcuate cross-section so as to have a shape complementary to the core.

Embodiment 2

An assembly comprising: an outer component; a shaft, wherein the shaft extends through the outer component; first and second races disposed in the outer component; a core in the form of a toroid; and at least one washer overlying the core and having a shape complementary to that of the core, the at least one washer comprising a polymer, wherein (i) the core is integrated with the first race and the at least one washer is disposed between the first and second races, or (ii)

the at least one washer overlies the core, the at least one washer and core being disposed between the first and second races.

Embodiment 3

The assembly of any one of the preceding embodiments, wherein at least one washer comprises a plurality of washers overlying the core, wherein a first washer overlies the core on a first axial end, and a second washer overlies the core on a second axial end relative to a central axis of the assembly.

Embodiment 4

The assembly of any one of the preceding embodiments, wherein the at least one washer has a half-round cross-sectional shape.

Embodiment 5

The assembly of any one of the preceding embodiments, wherein the core is at least partially torus-shaped.

Embodiment 6

The assembly of any one of embodiments 2-5, wherein the first race and the second race substantially enclose the assembly.

Embodiment 7

The assembly of any one of embodiments 2-6, wherein the first race and the second race are machined into the outer component.

Embodiment 8

The assembly of any one of embodiments 2-7, wherein the first race and the second race are located at a first axial end of the outer component.

Embodiment 9

The assembly of any one of embodiments 2-7, wherein the first race and the second race are located at a second axial end of the outer component.

Embodiment 10

The assembly of any one of embodiments 2-7, wherein the steering assembly further comprises a secondary first race and a secondary second race, wherein the first race and the second race are located at a first axial end of the outer component, and wherein the secondary first race and the secondary second race are located second axial end of the outer component.

Embodiment 11

The assembly of any one of the preceding embodiments, wherein the at least one washer has a radius of curvature of between about 1.6 mm to about 900 mm.

Embodiment 12

The assembly of any one of the preceding embodiments, wherein the core is rigid.

Embodiment 13

The assembly of any one of the preceding embodiments, wherein the core is solid.

Embodiment 14

The assembly of any one of the preceding embodiments, wherein the core comprises a metal, a polymer, or a combination thereof.

Embodiment 15

The assembly of any one of the preceding embodiments, wherein the polymer comprises a polyketone, a polyaramide, a polyimide, a polyetherimide, a polyamideimide, a polyphenylene sulfide, a polyphenylene sulfone, a fluoropolymer, a polybenzimidazole, a derivation thereof, or a combination thereof.

Embodiment 16

The assembly of any one of the preceding embodiments, wherein the washer comprises a substrate comprising a metal underlying the polymer.

Embodiment 17

The assembly of any one of the preceding embodiments, wherein at least one of the first race or the second race comprises a metal.

Embodiment 18

The assembly of any one of the preceding embodiments, wherein at least one washer has a spring rate of at least about 10 N/mm, about 25 N/mm, about 50 N/mm, about 100 N/mm, or about 200 N/mm.

Embodiment 19

The assembly of any one of the preceding embodiments, wherein at least one washer comprises a notched region free of polymer.

Embodiment 20

The assembly of embodiment 1, further comprising a first race and a second race between which the at least one washer is located, wherein the first race comprises the core such that the first race forms a concave surface against which the at least one washer is disposed.

Embodiment 21

The assembly of embodiment 20, wherein the second race has a concave surface against such that the at least one washer is located between the convex and concave surfaces of the first and second races, respectively.

Embodiment 22

The assembly of embodiment 20, wherein the at least one washer has opposite major surfaces, each of the opposite major surfaces comprising the polymer.

Embodiment 23

The assembly of embodiment 1, further comprising a first race and a second race between which the core and at least one washer are located.

Embodiment 24

The assembly of embodiment 23, wherein the first and second races each have a convex surface such that the at least one washer and core are disposed b/t the convex surfaces of the first and second races.

Embodiment 25

The assembly of embodiment 23, the at least one washer comprises first and second washers overlying the core such that the core is disposed between the first and second washers.

Note that not all of the features described above are required, that a portion of a specific feature may not be required, and that one or more features may be provided in addition to those described. Still further, the order in which features are described is not necessarily the order in which the features are installed.

Certain features are, for clarity, described herein in the context of separate embodiments, may also be provided in combination in a single embodiment. Conversely, various features that are, for brevity, described in the context of a single embodiment, may also be provided separately or in any subcombinations.

Benefits, other advantages, and solutions to problems have been described above with regard to specific embodiments, However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range, including the end range values referenced. Many other embodiments may be apparent to skilled artisans only after reading this specification. Other embodiments may be used and derived from the disclosure, such that a structural substitution, logical substitution, or any change may be made without departing from the scope of the disclosure. Accordingly, the disclosure is to be regarded as illustrative rather than restrictive.

What is claimed:

1. An assembly comprising:
    a core in the form of a toroid; and
    a first washer and a second washer each overlying the core, each washer comprising a polymer and a substrate comprising a metal underlying the polymer, wherein each washer has an arcuate cross-section so as to have a shape complementary to the core, and wherein the first washer overlies the core on a first axial end, and the second washer overlies the core on a second axial end relative to a central axis of the assembly.

2. The assembly of claim 1, wherein at least one of the first or second washers has a half-round cross-sectional shape.

3. The assembly of claim 1, wherein the core is at least partially torus-shaped.

4. The assembly of claim 1, wherein at least one of the first or second washers has a radius of curvature of between 1.6 mm to 900 mm.

5. The assembly of claim 1, wherein the core is solid.

6. The assembly of claim 1, wherein the core comprises a metal, a polymer, or a combination thereof.

7. The assembly of claim 1, wherein the polymer comprises a polyketone, a polyaramide, a polyimide, a polyetherimide, a polyamideimide, a polyphenylene sulfide, a polyphenylene sulfone, a fluoropolymer, a polybenzimidazole, a derivation thereof, or a combination thereof.

8. The assembly of claim 1, wherein at least one of the first race or the second race comprises a metal.

9. The assembly of claim 1, wherein at least one of the first or second washers has a spring rate of at least 10 N/mm.

10. The assembly of claim 1, wherein at least one of the first or second washers comprises a notched region free of polymer.

11. An assembly comprising:
    an outer component;
    a shaft, wherein the shaft extends through the outer component;
    first and second races disposed in the outer component;
    a core in the form of a toroid; and
    a first washer and a second washer each overlying the core and having a shape complementary to that of the core, each washer comprising a polymer and a substrate comprising a metal underlying the polymer, wherein the first washer, second washer and the core are disposed between the first and second races, and wherein the first washer overlies the core on a first axial end, and the second washer overlies the core on a second axial end relative to a central axis of the assembly.

12. The assembly of claim 11, wherein the first race and the second race substantially enclose the core and at least one of the first or second washers.

13. The assembly of claim 11, wherein at least one of the first race or the second race are machined into the outer component.

14. The assembly of claim 11, wherein the first race and the second race are located at a first axial end of the outer component.

15. The assembly of claim 11, wherein the first race and the second race are located at a second axial end of the outer component.

16. The assembly of claim 11, wherein the assembly further comprises a secondary first race and a secondary second race, wherein the first race and the second race are located at a first axial end of the outer component, and wherein the secondary first race and the secondary second race are located at a second axial end of the outer component.

* * * * *